(12) United States Patent
Kucherov et al.

(10) Patent No.: US 11,204,870 B2
(45) Date of Patent: Dec. 21, 2021

(54) TECHNIQUES FOR DETERMINING AND USING CACHING SCORES FOR CACHED DATA

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 16/818,139

(22) Filed: Mar. 13, 2020

(65) Prior Publication Data

US 2021/0286726 A1    Sep. 16, 2021

(51) Int. Cl.
  *G06F 12/0811*    (2016.01)
  *G06F 12/0871*    (2016.01)
  *G06F 3/06*    (2006.01)

(52) U.S. Cl.
  CPC ...... *G06F 12/0811* (2013.01); *G06F 12/0871* (2013.01); *G06F 2212/608* (2013.01)

(58) Field of Classification Search
  CPC ......... G06F 16/1748; G06F 2212/7201; G06F 2212/1044; G06F 2212/401; G06F 12/0811; G06F 2212/608; G06F 12/0871
  USPC ........................................................ 711/118
  See application file for complete search history.

(56) References Cited

U.S. PATENT DOCUMENTS

| | | | | |
|---|---|---|---|---|
| 5,773,741 | A * | 6/1998 | Eller | G10H 1/0041 |
| | | | | 382/187 |
| 7,574,420 | B2 * | 8/2009 | Bates | G06F 16/9537 |
| 9,606,870 | B1 | 3/2017 | Meiri et al. | |
| 2009/0100224 | A1 * | 4/2009 | Wang | G11B 27/30 |
| | | | | 711/118 |
| 2015/0074340 | A1 * | 3/2015 | Criswell | G06F 12/122 |
| | | | | 711/103 |
| 2015/0169450 | A1 * | 6/2015 | Traut | G06F 12/0813 |
| | | | | 711/142 |
| 2015/0381201 | A1 * | 12/2015 | Ansari | H04N 19/00 |
| | | | | 341/87 |
| 2017/0315930 | A1 * | 11/2017 | Hangud | G06F 12/0804 |

(Continued)

OTHER PUBLICATIONS

Anton Kucherov, et al, "Data Reduction Techniques for Use With Caching," U.S. Appl. No. 16/743,034, filed Jan. 15, 2020.

*Primary Examiner* — Hashem Farrokh
(74) *Attorney, Agent, or Firm* — Muirhead and Saturnelli, LLC

(57) ABSTRACT

Techniques for cache management may include: receiving pages of data having page scores, wherein each of the pages of data is associated with a corresponding one of the page scores, wherein the corresponding page score associated with a page of data is determined in accordance with one or more criteria including one or more of a deduplication score, a compression score, and a neighbor score that uses a popularity metric based on deduplication related criteria of neighboring pages of data; and storing the page of data in a cache in accordance with the plurality of page scores. The cache may include buckets of pages where each bucket is associated with a different page size and all pages in the bucket are the different page size. The one or more criteria may also include an access score. The page scores may be based on multiple criteria that is weighted.

22 Claims, 12 Drawing Sheets

(56) References Cited

U.S. PATENT DOCUMENTS

2021/0064544 A1\* 3/2021 Reed ................... G06F 12/1009
2021/0124689 A1 4/2021 Kucherov et al.

\* cited by examiner

TECHNIQUES FOR DETERMINING AND USING CACHING SCORES FOR CACHED DATA

BACKGROUND

Technical Field

This application generally relates to caching and, more particularly, to determining and using caching scores for cached pages.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for cache management comprising: receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and storing the plurality of pages of data in a cache in accordance with the plurality of page scores.

In at least one embodiment, each of the plurality of page scores associated with one of the plurality of pages of data may be determined in accordance with the one or more criteria, and wherein the one or more criteria may include the deduplication score for said one page of data stored in the cache. The deduplication score for said one page of data stored in the cache may be determined in accordance with a deduplication reference count indicating a number of times said one page of data is referenced by a logical address.

In at least one embodiment, each of the plurality of page scores associated with one of the plurality of pages of data may be determined in accordance with the one or more criteria, and wherein the one or more criteria may include the compression score for said one page of data stored in the cache. The one page of data may be stored in the cache in a compressed form, and wherein the compression score for the one page of data stored in the cache may be determined in accordance with an amount of cache consumed to store the compressed form of the one page of data. The cache may include a plurality of buckets of cache pages, wherein each of the plurality of buckets may be associated with a different one of a plurality of cache page sizes, and wherein cache pages included in a same one of the plurality of buckets may be a same size that is equal to the different one of a plurality of cache page sizes associated with the same one of the plurality of buckets. Each of the plurality of pages of data may be stored in the cache in a compressed form and wherein the compressed form of the page of data has an associated compressed size, and wherein the compressed form may be stored in a cache page selected from one of the plurality of buckets having an associated cache size that is a smallest of the plurality of cache page sizes capable of storing the compressed form.

In at least one embodiment, each of the plurality of page scores associated with one of the plurality of pages of data may be determined in accordance with the one or more criteria, and wherein the one or more criteria may include the neighbor score for said one page of data stored in the cache wherein the neighbor score may use a popularity metric based on deduplication related criteria of neighboring pages of data. The neighbor score for said one page of data stored in the cache may be determined based on one or more neighboring pages of data with respect to said one page of data, and wherein each of the one or more neighboring pages of data and said one page of data may be located in a logical address space, and wherein each of the one or more neighboring pages are located in logical addresses adjacent to other logical addresses mapped to said one page of data.

In at least one embodiment, the method may include determining that a first of the one or more neighboring pages of said one page of data is stored in the cache; and determining whether the first neighboring page is popular in accordance with the popularity metric, wherein the popularity metric determines that the first neighboring page is popular in accordance the deduplication related criteria of the first neighboring page. The deduplication related criteria of the first neighboring page indicates that the first neighboring page may be popular if it has an associated deduplication reference count above a specified threshold. The popularity metric determines that the first neighboring page may be popular of the first neighboring page stored in the cache has a last access time that is within a specified window of time.

In at least one embodiment, each of the plurality of page scores associated with one of the plurality of pages of data may be determined in accordance with the one or more criteria, and wherein the one or more criteria may further include an access score determined in accordance with when the one page of data was last accessed. Each of the plurality of page scores associated with one of the plurality of pages of data may be determined in accordance with the one or more criteria, and wherein the one or more criteria may further includes an access score determined in accordance with a frequency of accesses of the one page of data that occurred within a specified window of time. The one or more criteria may include the neighbor score, the deduplication score, the compression score, and an access score. Each of the plurality of page scores associated with one of the plurality of pages of data stored in the cache may be determined using a function that takes a plurality of inputs for the one page of data, wherein the plurality of inputs may include the neighbor score, the deduplication score, the compression score, and the access score. The function may compute the page score for the one page of data stored in the cache as a weighted sum or product of a plurality of terms in which each of the plurality of terms includes one of the plurality of inputs and a weight corresponding to said one input. The cache may be a read cache that includes only read data for read I/O operations.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
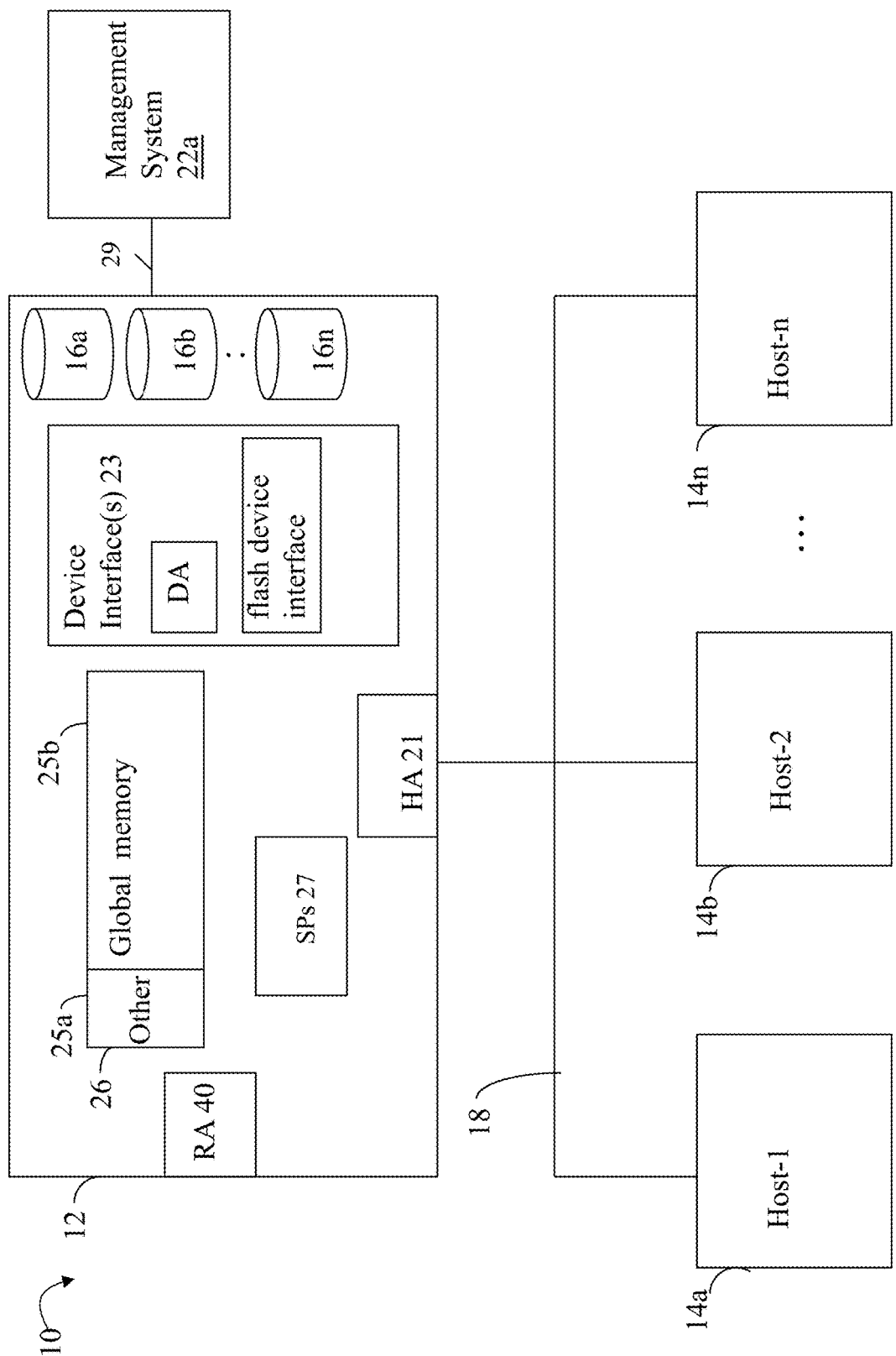
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface or controller 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with the techniques herein, the data storage system may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface or backend device controller, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request (e.g. the read I/O path), a determination may be made as to whether all the requested read data is in cache (e.g., a cache hit where read data is stored in a data cache). If so, the read request may be characterized as a read hit, cache hit or read cache hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA, or more generally a backend physical storage device controller, retrieves the requested data from a PD and writes the retrieved read miss data (retrieved from the PD) to the cache where the HA, or more generally front end component, then retrieves the requested data from the cache to return to the requesting host.

In connection with write operations and write I/O path processing, write data received at the data storage system may be stored in cache and then written out or destaged later to physical storage, such as written to backend physical storage devices by a DA. Once the write data is written into cache, the data may be marked as dirty or write pending (WP) in cache denoting that the cached write data is the most recent copy of the data and needs to be destaged to backend physical storage devices. The cache location including the WP data may be marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

As data for I/Os and other processing is stored in the cache, a cache memory location, such as a cache slot or cache page, may be allocated for use in storing such data. At various points in time, there may not be any free or available cache or the amount of free or available cache may reach a minimum threshold level. In response to such conditions and possibly others, processing may be performed in connection with cache management to obtain a free or available cache location such as by evicting one or more cache pages. Generally, any suitable cache management technique known in the art may be used to manage the cache. For example, an embodiment may use the least recently used (LRU) cache management technique which may remove data from cache based on when the data has been last referenced. For example, a time stamp may be associated with each data portion stored in the cache where the time stamp denotes the last time (e.g., date, hour, minutes, seconds in terms of wall clock time) the data portion was referenced. The most recently referenced data may have the most recent time stamp and may remain in the cache longer than other data referenced having older time stamps. The foregoing time stamps may be used to select particular data for eviction when a new cache location is needed to store new data. The foregoing time stamps may also be used in a proactive cache management technique, for example, to select data for removal when the amount of free or available cache falls below a specified amount. Data may be removed from the cache by destaging pending write data, evicting data from one or more cache pages that are the least recently used with respect to cached data, and the like.

Although not illustrated in FIG. 1 for simplicity, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16a-n.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers 13 an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data.

Figure 2:
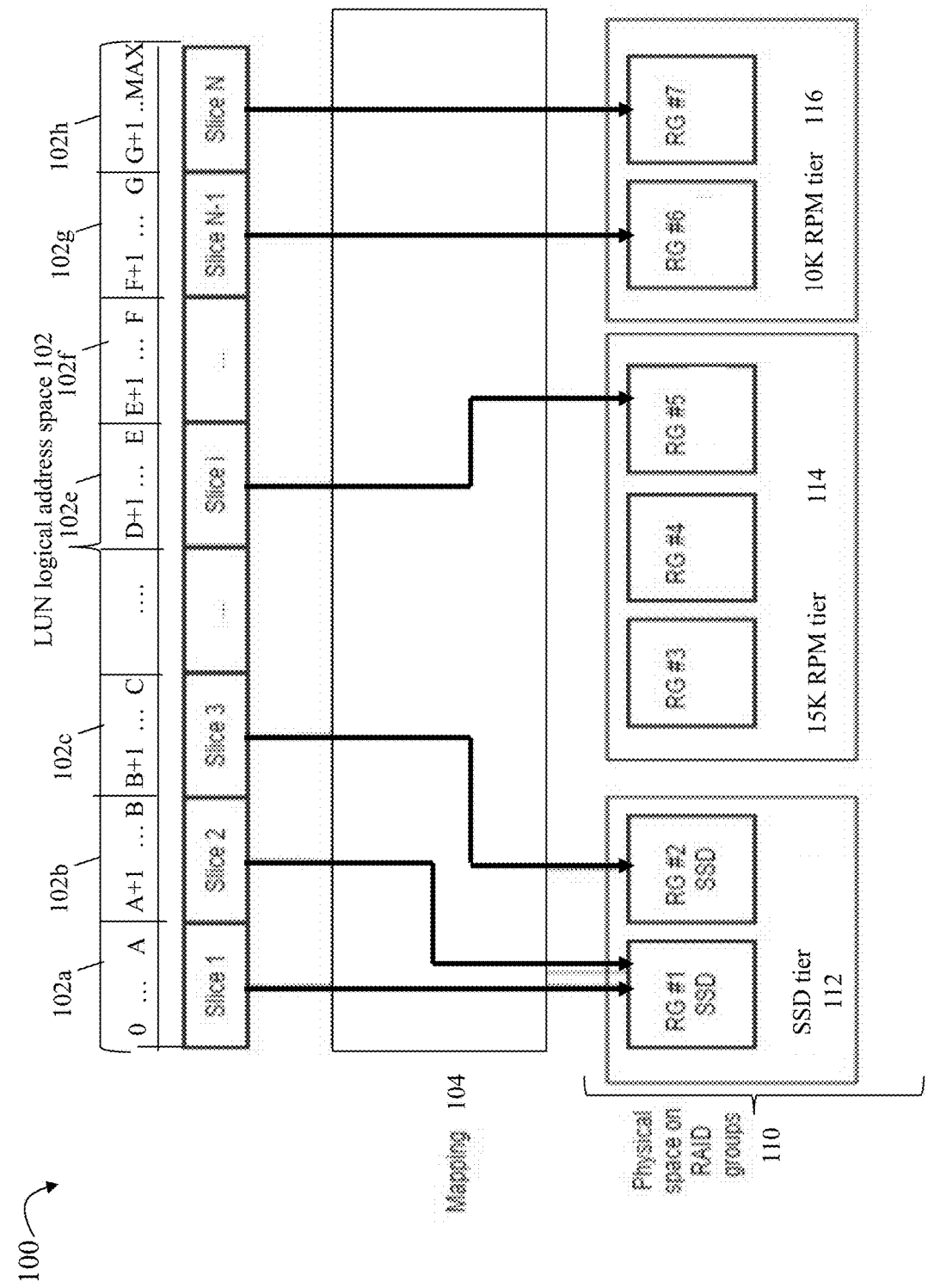
FIG. 2 is an example illustrating logical to physical mapping that may be used in an embodiment in accordance with the techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In connection with user data that is written to a LUN and then stored on the PDs, or more generally, back-end non-volatile storage devices, various types of metadata (MD) may also be stored. The MD may include, for example, various structures used to access the stored user data, attributes about the LUN, and the like. To further illustrate, the MD for a LUN may include location information identifying where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for an LBA of a LUN may include location MD identifying the physical storage location mapped to the particular LBA.

Figure 3:
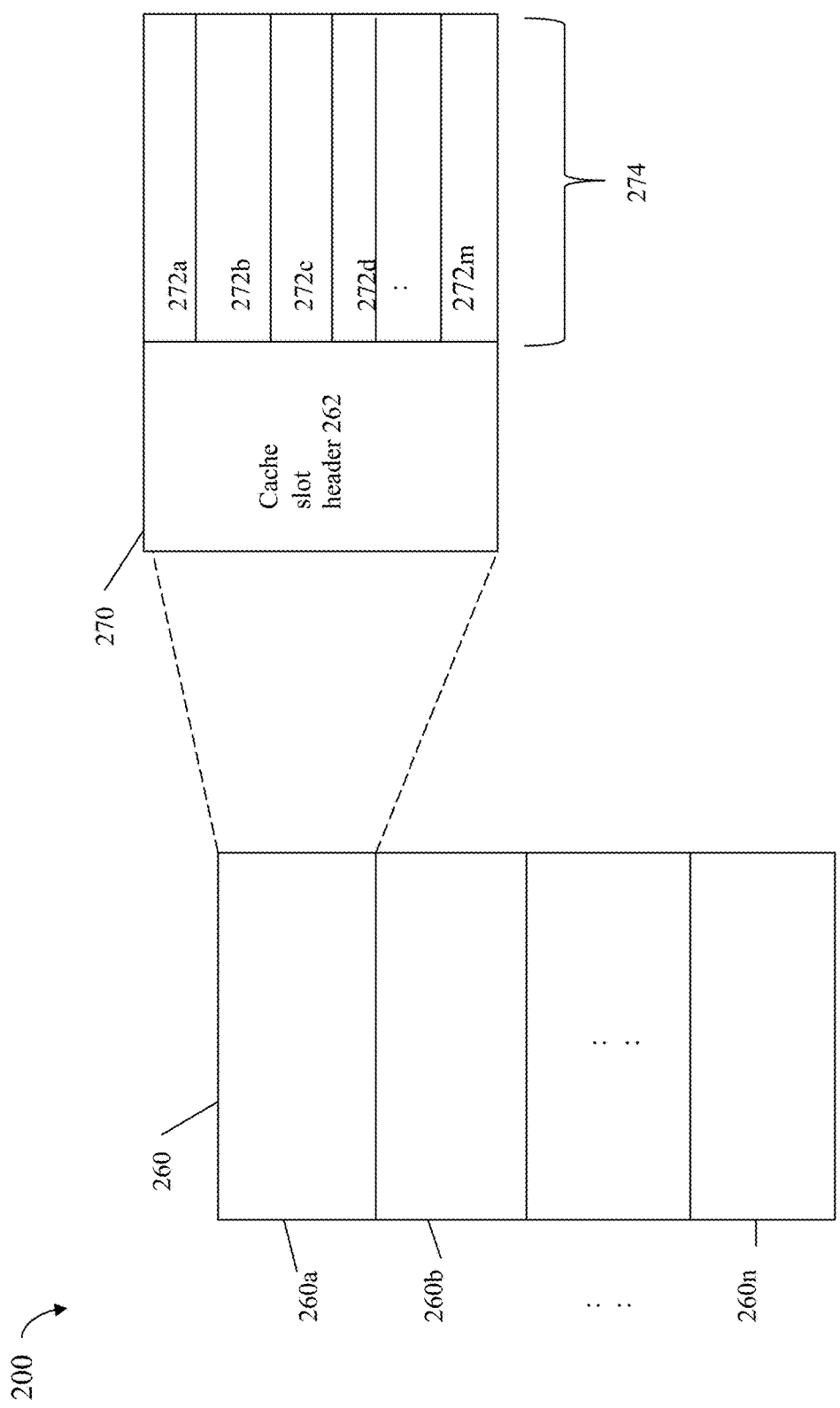
FIG. 3 is an example illustrating a logical representation of a cache in an embodiment in accordance with the techniques herein.

Referring to FIG. 3, shown is an example illustrating a logical representation of a cache that may be used in an embodiment in accordance with techniques herein. In the example 200, element 260 may represent the memory or storage used as the cache which is partitioned into cache slots or pages 260a-260n. It should be noted that the example 250 is a logical representation of a cache that may be implemented using any suitable data structure(s) known in the art. Element 270 provides additional detail of single cache slot or page 260a. The cache slot or page 260a may include a cache slot or page header 262 and cache slot or page data 274. The cache slot data 274 illustrates that a single cache slot or page of data may further include multiple portions 272a-m. The cache slot header 262 may include additional information regarding the cached data stored in 274. For example, the header 272 may denote whether the data cached in each of the portions 272a-m is write pending (WP) or dirty cached data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

When performing various data storage services or processing I/O operations that access data stored on a LUN, data read from and/or written to a LUN may be processed using the typical I/O or data path such as described herein. For example, consistent with other discussion herein, when reading data from a LUN of the data storage system, the data may be read from the LUN, stored in the cache of the data storage system, and then further read from the cache for use by one or more other components of the data storage system. For example, data may be read from a LUN in response to a read I/O from a client, such as an external host. The data may result in a cache miss wherein the requested read data is read from a backend PD and then stored in the cache. The read data stored in the cache may then be read by another component, such as a front end component that is an HA or an FA, that returns the read data from the cache to the client that issued the read I/O operation.

Figure 4:
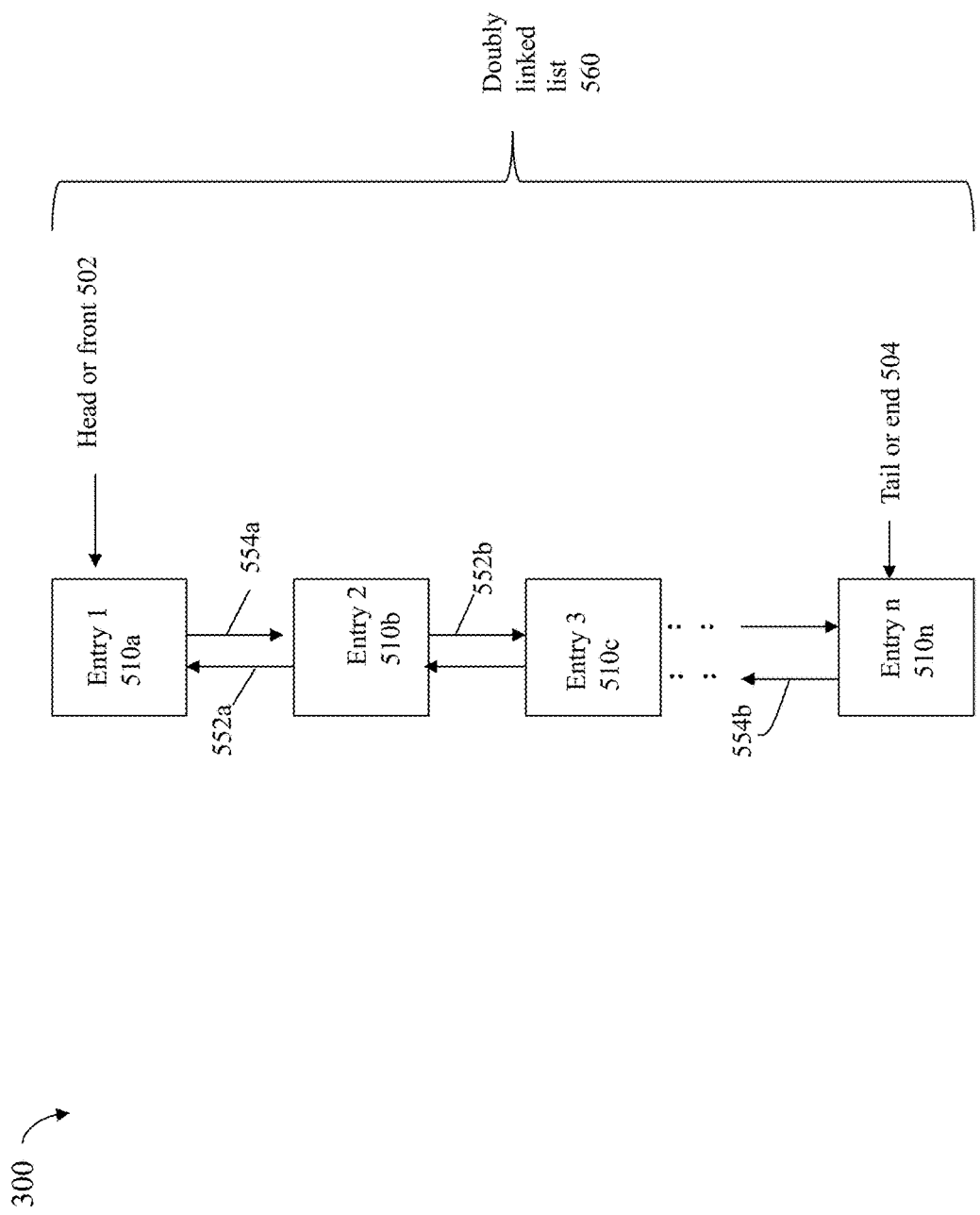
FIG. 4 is an example illustrating a double linked list of cache pages of a bucket that may be used in an embodiment in accordance with the techniques herein.

Referring to FIG. 4, shown is an example of a doubly linked list of cache locations that may be used in an embodiment in accordance with the techniques herein. Each entry in the list 560 denotes a cache page. Thus, the list 560 includes multiple cache pages. The head or front pointer 502 may denote the head or front of the list, and thus the first entry in the list 560. The tail or end pointer 504 may denote the end or tail of the list, and thus the last entry in the list 560.

Each entry of the list 560, except the last current entry 510n, points to the next entry in the list. For example, entry 510a points to entry 510b as denoted by the arrow 552a.

In at least one system in which the cache is managed based on the LRU technique described briefly herein and known in the art, the list 560 of entries may be maintained so that the head or front pointer 502 points to the most recently used entry and the tail or end pointer 504 points to the least recently used entry of the list.

Whenever an existing entry of the list 560 is accessed, it may be moved to the head or front 502 of the list so that the most recently used entries are at the head or front of the list. Thus, the entries in the list 560 may appear from most recently used entries to least recently used entries by traversing the list 560 from the head or front 502 to the tail or end 504.

When adding a new entry to the list for a new data block being stored in the cache and there are no free entries, the current entry at the tail or end 504 is evicted in that it is overwritten with information for the new entry being inserted.

In the example 300 of the doubly linked list, each entry of the list 560, other than the first entry 510a and last entry 510n, include a forward pointer to the next entry and also include a backward pointer to the previous or prior entry in the list. For example, entry 510b includes a pointer 552a to the prior entry 510a and also includes a pointer 552b to the next entry 510c in the list 560. The first entry 510a currently at the head or front 502 of the list only includes a pointer 554a to the next entry 510b in the list 560. The last entry 510n currently at the tail or end 504 of the list only includes a pointer 554b to the previous or prior entry (not illustrated) in the list.

More generally, an embodiment of a data storage system may use the data structure such as illustrated in FIG. 4 in connection with implementing other cache management policies and techniques besides LRU. In such systems, for example, list may denote a ranking or order, from the head 502 to the tail 504, in which pages may be considered for eviction at a point in time. The ranking may denote a priority with the head 502 denoting the page with the highest priority for cache retention and the tail 504 denoting the page with the lowest priority for cache retention. In such systems, the tail 504 of the list may identify the entry or cache page that is the first of all entries in the list to be evicted; and the head 504 of the list may identify the entry or cache page that is the last cache page of all in the list to be evicted. The closer an entry is to the tail, the sooner it will be evicted. The closer an entry is to the head, the later it will be evicted. The entries in the list 560 may be reordered as needed when reevaluating the order or priority of the entries.

Data storage systems may also perform data services selected for use in connection with user data stored on LUNs, and thus PDs, of the data storage system. For example, in at least one embodiment in accordance with the techniques herein, the data storage system may perform one or more data reduction services or operations, such as data compression and decompression. Such data reduction operations attempt to reduce the amount of storage needed for storing data on non-volatile backend storage devices (e.g., PDs) with the goal of reducing the cost per unit of storage consumed (e.g., dollar cost per GB of storage). In at least one embodiment, the compression technique may be a lossless compression technique such as an algorithm from the Lempel Ziv algorithm family (e.g., LZ77, LZ78, LZW, LZR, and the like).

In at least one embodiment, the data storage system may perform additional data reduction services or operations such as data deduplication. Data deduplication generally refers to removing redundant or duplicate data portions. Data deduplication techniques may include looking for duplicate data chunks whereby only a single instance of the data chunk is retained and stored in the cache and the backend PDs providing the non-volatile physical storage. Pointers or references to the data chunk may be used which reference or identify the single stored instance of the data chunk. With data deduplication in at least one data storage system, a data chunk may be the size of a single page of data such as may be stored in a single entry or page of the cache. The data may be addressed or referenced by a unique name, token, identifier, and like, derived from the content of the data. In at least one embodiment, a hash value derived from the content or data using a hash function may be used to refer to the content or data. As known in the art, the hash value may be generated using a hash function such as a cryptographic hashing function or other suitable hash function.

Figure 5:
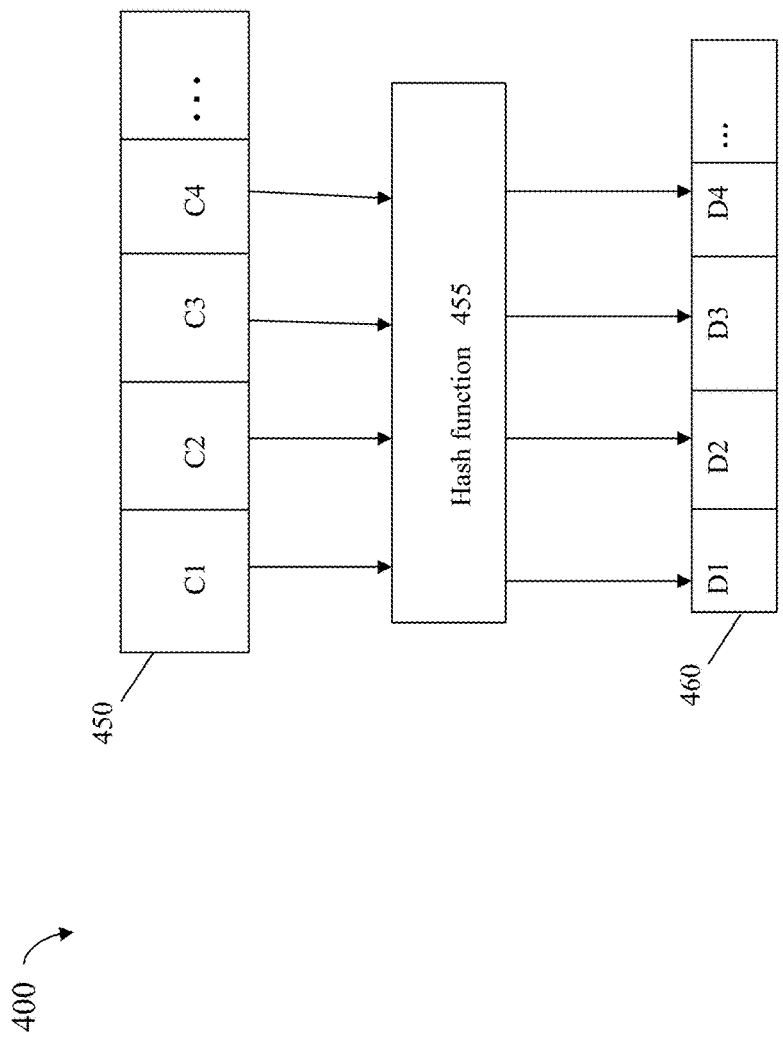
FIG. 5 is an example illustrating use of a hash function in computing hash values or digests for chunks or pages of data in an embodiment in accordance with the techniques herein.

Referring to FIG. 5, shown is an example 400 illustrating processing that may be performed in connection with data deduplication processing in an embodiment in accordance with techniques herein. The element 450 may denote the original data being written or stored. The original data may be partitioned into multiple data chunks C1, C2, C3, C4 and the like. In at least one embodiment, the data chunks may all be the same size, such as a single logical block. However, the size may vary with embodiment. Each chunk is provided as an input to hash function 455. In at least one embodiment, the hash function 215 may be the SHA-256 or SHA-1 hashing algorithm, or more generally, any suitable cryptographic hashing function known in the art. For each chunk of 450, the hash function 455 may perform processing and generate, as an output, a hash, hash value or digest. Element 460 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 455 is selected which has an acceptably low probability of a "hash collision" of generating the same digest or hash value for two different chunks. The strength of the hash function 455 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk may be stored in the cache as well as on the backend PDs. The single stored instance of the data chunk may be referenced, for example, using the digest, which is the hash value of the cached data chunk. In cases of a hash collision (where two data chunks result in generating the same digest), an embodiment may use any suitable technique to handle the collision. For example, in one embodiment, a list may be maintained for different data chunks mapping to the same digest. When determining whether a new data chunk is a duplicate of an existing data chunk already stored, the new data chunk may be considered a duplicate if the new data chunk and the existing chunk have the same digest. Additionally, since there may be hash or digest collisions in which 2 different data chunks have the same hash or digest, processing performed to confirm that a new data chunk and an existing data chunk having the same digest are actually identical may include additionally comparing the new and existing data chunks (e.g., bit for bit) and determining whether the new data chunk matches the existing data chunk. In a system maintaining a list of different data chunks having the same digest, such processing may include traversing the list and comparing a new data chunk to each existing data chunk on the list to locate a matching existing data chunk for the new data chunk.

In connection with cache management, techniques may be used to decide which pages to keep in the cache and which to evict from the cache. Some existing systems may make such decisions based on data access patterns and frequency of access. One example of such a cache management technique used in some systems is LRU, which is discussed above. As a further example illustrating frequency of access, a page that has been accessed multiple times in recent history may be preferably retained in the cache over another page that has not been accessed recently. In at least one existing system that stores and organizes data in the cache based on logical addresses of where the data is stored, for example, on various LUNs of the system, pages may be retained in the cache and also prefetched and stored in the cache by considering locality of reference of neighboring pages.

In order to further increase the data storage system performance such as increase I/O response time, it may be desirable and beneficial to utilize a cache management technique that may consider additional or alternative criteria when determining what pages to retain in cache and what pages to evict from cache.

Described in following paragraphs are cache management techniques that may consider data access patterns and frequency of access as well as additional or alternative criteria when determining what pages to retain in cache and what pages to evict from cache. The techniques described in following paragraphs may result in increased effective use of the cache in increasing data storage system performance such as by resulting in an increased cache hit ratio whereby the I/O response time is further reduced and improved.

In at least one embodiment in accordance with the techniques herein, each page of cached data may be assigned a score, sometimes referred to as an overall score or page score, determined in accordance with one or more criteria including one or more factors, attributes or variables. The scores associated with the cached pages of data may be used in determining and selecting which one or more pages to evict or retain in cache at different points in time. The factors, attributes or variables used in determining the scores for each cached page of data may include a deduplication (D) score, a compression (C) score, a neighbor (N) score, and an access time (A) score. In at least one embodiment, each page score may be determined using a plurality of factors, attributes or variables including the D score, the C score, the N score, and the A score. In at least one embodiment, each page score may be determined using one or more factors, attributes or variables including at least one of the C score and the D score. In at least one embodiment, each page score may be determined using one or more factors, attributes or variables including at least one of the C score, the D score, and the N score, where the N score for a cached page is determined using a popularity metric. For example, the popularity metric may be based on deduplication related criteria of neighboring pages with respect to the cached page.

In at least one embodiment in accordance with the techniques herein, the data storage system may perform data reduction services or operations including data deduplication and compression with respect to pages of data. In at least one embodiment, data may be stored in the cache in compressed or uncompressed form.

The foregoing and other aspects of the techniques herein are described in more detail in the following paragraphs.

Prior to discussing further details regarding how to determine the C score, D score, N score and A score for each cached page and how to use the foregoing in calculating the overall or page scores for pages of cached data, the following paragraphs provide an initial discussion regarding how the cache may be organized and arranged in an embodiment in accordance with the techniques herein.

As noted above, a score may be determined for each page of data stored in the cache. The score for each page may be used in sorting or ordering pages in the cache and may be used in determining an order in which pages are selected for eviction from the cache. In at least one embodiment in accordance with the techniques herein, a structure such as described in connection with FIG. 4 may be used to organize pages of cached data. However, rather than organize and sort the pages of cached data based solely on last or most recent access time as described above, an embodiment in accordance with the techniques herein may sort or organize the linked list of cached pages based on the scores of the pages, where the pages are entries in the list. In at least one embodiment and with reference back to the FIG. 4, the higher the score associated with a cached page, the closer the page is to the head 502 of the list, and the lower the score associated with a cache pages, the close the page is to the tail 504 of the list. In such an embodiment, pages may be selected for eviction from the cache beginning with the tail 504 and ending with the head 502. Periodically, or more generally at any desirable time and in response to the occurrence of any specified trigger condition, the scores of the cached pages may be recalculated and the list of cached pages may be resorted according their scores. The page with the lowest score may be located at the tail 504 and the page with the highest score may be located at the head 502. In at least one embodiment, the score of a page may be also be updated responsive to a hit to the page. Prior to selecting one or more pages for eviction, the cached pages may be resorted to ensure any rescored pages such as due to a cache hit are included in their proper position in the sorted ordering based on the page scores.

In at least one embodiment, the cache may be organized in an arrangement in which all cached pages may be included in a single list, such as a single linked list as described above and illustrated in FIG. 4. In such an embodiment, the list may be stored as described above based on the scores of the cached pages. As a variation in at least one embodiment, the cache may be organized in arrangement including multiple such lists of cached pages. In such an embodiment including multiple lists of cached pages, each such list may be independently organized and managed as just described for the single list. In at least one embodiment, the cache may be organized using a different arrangement of one or more structures which may or may not include linked lists. In such an arrangement, the structures used to represent the cache may include any of a hash table, one or more arrays of entries, or buckets of pages using another structure besides a linked list that enables the cache management system to find pages with low scores and designate them for eviction.

In at least one embodiment in which data stored in the cache may be in its compressed or uncompressed form, the cache may be organized using multiple lists as will now be described in more detail.

In at least one embodiment in accordance with the techniques herein, data may be stored in its compressed form on the backend non-volatile storage PDs. When organizing a cache, such as one including at least read data used in connection with read I/O operations, the data may be stored in its compressed form or its uncompressed form in the cache. For example, in response to a read miss (or read cache miss) where read data requested for a read I/O operation is not in the cache, the requested read data may be read from a backend PD where the read data is stored in its compressed form. The compressed form of the read data obtained from the PD and stored in the cache in its compressed form. The compressed data may be decompressed whereby the decompressed or uncompressed form of the read data may then be returned to the requesting client that issued the read I/O operation. By storing compressed pages of data in the cache rather than uncompressed data, the effective size of the cache may be increased. In a cache that contains compressed pages, the average compression ratio may indicate the effective increase in size of the cache. For example, if all pages stored in the cache are compressible by 50% the cache can be used to store twice as many cached pages when stored in their respective compressed forms. Thus storing compressed pages of data in the cache may result in improved cache hit ratios and an improvement in data storage system performance, such as improved I/O response time.

In at least one embodiment in accordance with the techniques herein, the cache may include a combination of compressed and uncompressed data. In at least one embodiment, the cache may include sections or buckets of cache pages. Each section or bucket has an associated cache page size and includes cache pages of the associate cache page size. For example, an embodiment may include a first section or bucket of cache pages of the size 8K bytes, a second section or bucket of cache pages of the size 4K bytes, and the possibly other additional sections or buckets of cache pages of different sizes. When storing compressed data in the cache, processing may select a particular cache section or bucket having an associated cache page size that can accommodate storing the compressed data. The page size may be the smallest page size available to accommodate the compressed data.

In at least one embodiment, the cache may be initially partitioned into a number of sections or buckets where each section or bucket is an initial size denoting an initial amount of the cache allocated for the bucket. As time progresses during operation of the system, cache repartitioning may be performed where the sections or buckets may be resized and adjusted dynamically based on one or more metrics. For example, if cache pages of a particular page size in a first section or bucket are used much less frequently than any other cache page sizes of other sections or buckets, the cache sections or buckets may be resized or repartitioned to reduce the total size and amount of cache allocated for the first section or bucket. In at least one embodiment, each of the sections or buckets of cache pages of a particular page size may be maintained as a list or other suitable structure.

In at least one embodiment, each section or bucket of cache pages of a particular size may be managed as a list. Thus, each list includes entries that are cache pages of the same page size. In such an embodiment, the cache may be implemented using multiple lists of structures corresponding to cached pages of data. In at least one embodiment, each such list of cache pages of a particular size may be implemented as a double linked list such as described above and illustrated in FIG. 4 although more generally any suitable structure may be used.

In at least one embodiment, a system page size may denote the size granularity of an uncompressed data chunk where the system page size is 8K bytes. A page may refer to a single unit or amount of memory located in the cache. In connection with the techniques herein, the cache may be implemented to include multiple cache page sizes. Various techniques may be used for general cache management (e.g., eviction policy for selecting data of cache pages for removal from the cache, flushing policy for determining when and/or how much write pending data to flush from the cache to the non-volatile storage, and the like). Based on embodiments in accordance with the techniques herein, the cache may also include multiple buckets, groups or sections of cache pages. Processing may be performed for cache management based on multiple cache page sizes. A different cache page size may be specified for each bucket, group or section where each such bucket, group or section includes cache pages of only its specified cache page size. In this manner, a single bucket, group or section may include cache pages of the same size.

In at least one embodiment, the cache may be implemented using suitable form of memory or storage. For example, in at least one embodiment, the cache may include one or more of volatile RAM, non-volatile or persistent SCM (Storage Class Memory), and the like. As known in the art, SCM may be characterized as a storage or memory tier that is slightly slower than DRAM but provides for persistent data storage. The cache may be implemented using one or more caching tiers or layers, such as a primary caching tier or layer and a secondary caching tier or layer, where the primary tier or layer may be a form of memory that is relatively faster than the form of memory of the secondary caching tier or layer. The techniques herein may be used in connection with one or more of the caching tiers or layers in an embodiment.

In at least one embodiment, the system may have separate read and write caches for storing, respectively, only read I/O data and only write I/O data. In at least one embodiment, the techniques herein may be used in connection with the read cache but not the write cache. In such an embodiment, the write cache may be implemented as a log-based write cache where write data is sequentially written to a log-based device and then later destaged from the cache to the PDs. Once the write data is written to the log-based device, successful completion of the write I/O may be sent to the client, such as a host. The write cache may be implemented as a log in which each subsequent write I/O and write I/O data is recorded in a next logically sequential record of the log. The log may be circular in nature in that once a write is recorded in the last record of the log, recording of the next write proceeds with recording in the first record of the log.

In at least one embodiment, the techniques herein may be used in connection with one or more caches for storing both read and write I/O data. In such an embodiment, the write cache may be a non-log based write cache. In at least one such embodiment, the read and write data may be stored in the same cache managed and organized as described herein. In such an embodiment, the write I/O data stored in the cache that is write pending cannot be evicted from the cache while it is marked as WP. In such a case, the WP data is first flushed or destaged from the cache to the backend PDs so that the data is no longer "write pending". Subsequently, once the WP status is removed, the cache page including the data may be evicted from the cache.

An embodiment may initially partition and also subsequently repartition the cache into sections or buckets. In connection with such partitioning and repartitioning, the total size or amount of cache allocated for each bucket may be based on one or more metrics, such as one or more metrics related to access frequency or cache activity level for each of the buckets. For example, assume there are 4 buckets with respectively associated cache page sizes (in bytes) of 8K 4K, 2K and 1K. Assume processing, such as based on one of the metrics, determines to equally divide the total cache among the 4 buckets. If the total cache size is 400 GB, each bucket may initially have a size of 100 GB. Thus the number of cache pages in each bucket will vary but the total overall size of each bucket is the same.

As a variation, an embodiment may partition and also repartition the cache into sections or buckets but where the number of cache pages or entries in each bucket is based on the one or more metrics. For example, assume there are 4 buckets with respectively associated cache page sizes (in bytes) of 8K 4K, 2K and 1K. The total cache size may be partitioned so that each bucket may initially include the same number of cache pages. Thus the number of cache pages in each bucket may be the same but the total overall size of each bucket of cache pages may vary.

For purposes of illustration, following examples may partition and repartition the cache based on the former based on the total size or amount of cache allocated for each bucket. Also, for purposes of illustration, the following examples may refer to an embodiment in which there are 4 buckets with respectively associated cache page sizes of 8K, 4K, 2K and 1K. However more generally any suitable number of buckets of different cache page sizes may be used in an embodiment in accordance with the techniques herein.

Figure 6:
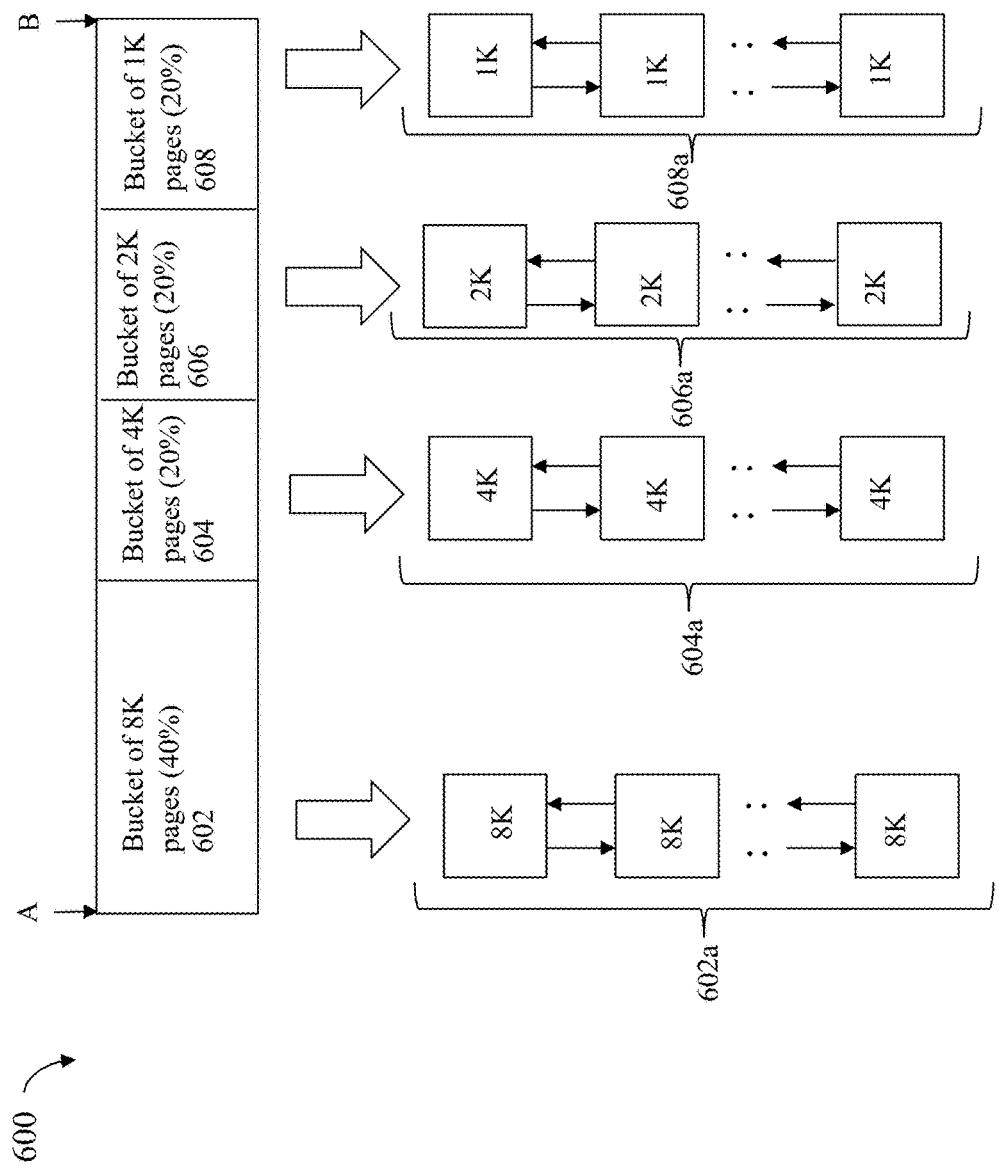
FIG. 6 is an example illustrating an arrangement of multiple buckets of cache pages in an embodiment in accordance with the techniques herein.

Referring to FIG. 6, shown is an example 600 illustrating an initial partitioning of the cache into multiple buckets of cache pages in an embodiment in accordance with the techniques herein. The example 600 includes 4 buckets 602, 604, 606 and 608 of cache pages, although an embodiment may generally include any suitable number of 2 or more buckets. Each of the buckets includes cache pages of an associated cache page size. Each of the buckets has a different associated cache page size. Each bucket may include only cache pages of the particular cache pages size associated with the bucket. Consistent with discussion elsewhere herein, each bucket is illustrated as a doubly linked list that may be managed and organized as described in connection with FIG. 4 with the difference that the pages of entries in each list may be sorted based on the scores of the pages as noted above.

The bucket 602 includes cache pages that are 8K bytes in size. Element 602a denotes the linked list of 8K byte size cache pages. The bucket 604 includes cache pages that are 4K bytes in size. Element 604*a* denotes the linked list of 4K byte size cache pages. The bucket 606 includes cache pages that are 2K bytes in size. Element 606*a* denotes the linked list of 2K byte size cache pages. The bucket 608 includes cache pages that are 1K bytes in size. Element 608*a* denotes the linked list of 1K byte size cache pages. More generally, any suitable cache page size or granularity may be associated with each bucket. In the example 600, a single page of uncompressed data may be 8K bytes in size. Thus, the bucket 602 may include uncompressed cache data pages. Data may be stored in its uncompressed form for one or more reasons, some of which are described herein. For example, the page of data may be accessed frequently (e.g., exceeding a specified threshold level) and it may be determined to store the page of data in its uncompressed form to avoid the latency incurred when decompressing the data. As another reason, processing may determine that the page of data is uncompressible or does not achieve at least a minimum level of compressibility (e.g., does not have a compression ratio exceeding a specified compression ratio threshold).

When storing compressed data, one of the buckets may be selected based on the size of the compressed data to accommodate storing the compressed data in the cache. For example, if a compressed page of data is 3.5K bytes in size, the compressed data is stored in a 4K bytes size cache page of the bucket 604. Generally, the cache page selected may be the smallest cache page size that the compressed page of data fits into. The cache page selected may be from a bucket having an associated cache page size that is the smallest of all available cache pages sizes that are equal to, or greater than, the size of the compressed page (e.g., compressed page=3.5K bytes, possible cache page sizes are 4K and 8K, where 4K, which is the smallest or minimum of these cache page sizes, is selected).

The initial partitioning of the cache into multiple buckets may determine an amount of the cache allocated for each bucket using any suitable technique. In the example 600, an initial partitioning may allocate 40% of the cache to bucket 602 and 20% of the cache to each of the buckets 604, 606 and 608.

At one or more subsequent points in time, the cache may be repartitioned among the buckets. The repartitioning may be dynamically performed and adjusted, for example, based on one or more cache activity level metrics or access frequency metrics determined for each bucket.

Additional detail, for example, regarding the particular metrics that may be used for partitioning the cache into buckets as well as other aspects that may be used in connection with the cache arrangement such as illustrated in FIG. 6 is described, for example, in U.S. patent application Ser. No. 16/743,034 filed on Jan. 15, 2020, entitled DATA REDUCTION TECHNIQUES FOR USE WITH CACHING, Kucherov, et al., which is incorporated by reference herein in its entirety.

What will now be described in more detail is how an embodiment in accordance with the techniques herein may determine the C score, D score, N score and A score for each cached page and how to use the foregoing in calculating the overall or page scores for pages of cached data.

The C score or compression score for a page of data may be used to generally provide for increased weight or preference in retaining compressed pages of data in cache vs. uncompressed pages of data. In at least one embodiment, the C score for a page of data increases as the amount of cache space consumed, when storing the compressed form of the data in the cache, decreases. To further illustrate, reference is made to FIGS. 6 and 7. Assume in this example that there is a cache arrangement as described in connection with the buckets of cache pages sizes of 8K, 4K, 2K and 1K as illustrated in FIG. 6.

Figure 7:
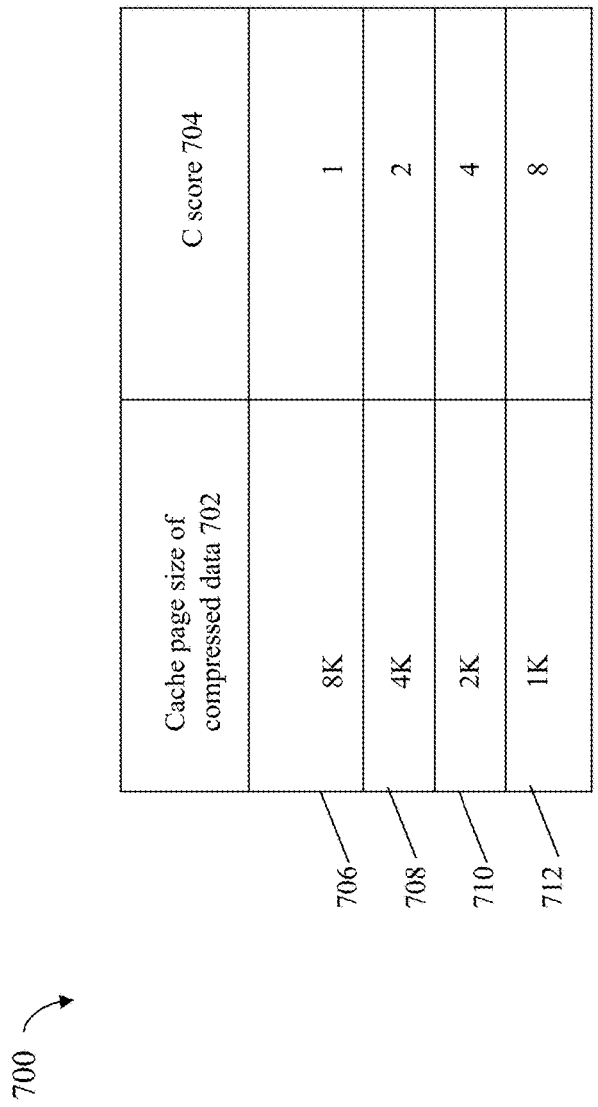
FIG. 7 is an example of a table that may be used in connection with assigning C scores for cached pages in an embodiment in accordance with the techniques herein.

Referring to FIG. 7, shown is an example of a table that may be used in determining the C score for a cached page of data in an embodiment in accordance with the techniques herein. The table 700 includes a first column 702 of the different cache page sizes and a second column 704 of the C scores for the different cache page sizes of the column 702. The table 700 includes the cache pages sizes of 8K, 4K, 2K and 1K as illustrated in FIG. 6.

The row 704 indicates that for a cached page of data that is stored in an 8K page, its associated C score is 1. In this example, the 8K page size may be the system page size and 8K may be the size of each cache page of data when in its original uncompressed form. The row 706 indicates that for a cached page of data that is stored in an 4K page, its associated C score is 2. The row 708 indicates that for a cached page of data that is stored in an 2K page, its associated C score is 4. The row 710 indicates that for a cached page of data that is stored in an 1K page, its associated C score is 8.

It should be noted that an embodiment may generally use any suitable technique to determine the C score for cache pages. The particular values specified in the table 700 as well as the particular cache pages sizes, number of buckets, and the like, may vary with embodiment. More generally, an embodiment may use any suitable cache pages sizes, any suitable number of buckets, and any suitable C scores.

The D score or deduplication score of a cached page of data may be used to generally provide for increased weight or preference in retaining pages of data in cache which have higher deduplication reference counts. In at least one embodiment, a deduplication reference count associated with a page of data may denote a number of times that the data is referenced as related to data deduplication. Thus a deduplication reference count of 1 indicates that there is only a single reference to the data. In contrast, a deduplication reference count of 3, for example, indicates that the same single copy of the cached data page is referenced or used 3 times, such as by 3 logical addresses. In at least one embodiment, the D score for a cached page of data may simply be the deduplication reference count of the cached page of data. More generally, any suitable technique may be used to determine the D score.

Figure 8:
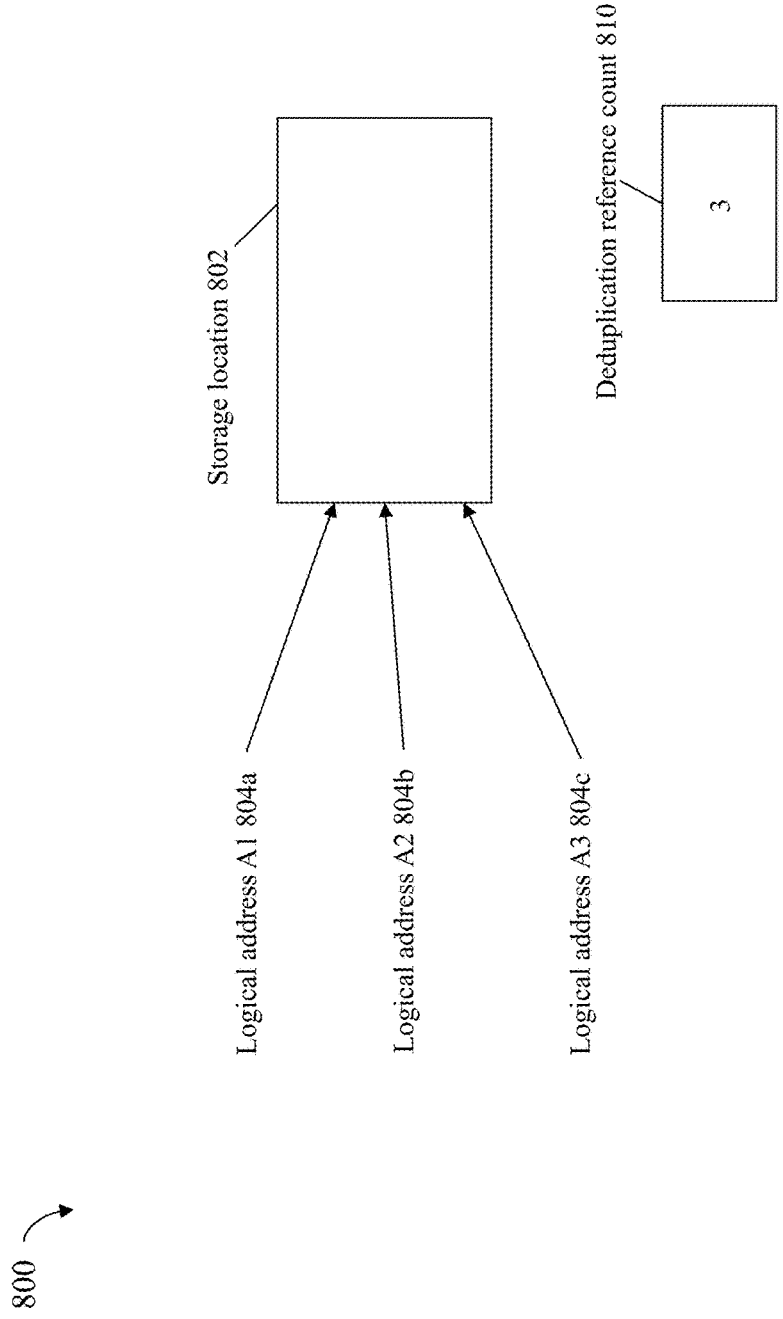
FIG. 8 is an example illustrating data deduplication and an associated deduplication reference count in an embodiment in accordance with the techniques herein.

To further illustrate use of another technique in connection with determining D scores for cached pages of data, reference is made to FIG. 8. In the example 800 of FIG. 8, the cache location 802 may refer to the cache allocated for storing a page of data. At a first or initial time T1, a first write I/O operation may write first data to the logical address A1 804*a*. Deduplication processing may determine that the first data is an original instance and not a duplicate of existing stored data in the cache or on physical storage whereby the storage location 802 may denote physical storage (e.g., on the backend PDs) that is allocated for storing the first data. The logical address A1 804*a* may be the first or initial reference to the first data stored in the storage location 802. The logical address A1 804*a* may be, for example, LUN A, LBA X, where X is an LBA in LUN A's logical address space.

At a subsequent point in time T2, a second write I/O operation may write another instance of the first data to the second logical address A2 804*b*. The logical addresses A1 804*a* and A2 804*b* are different logical addresses. The logical address A2 804*b* may be, for example, LUN B, LBA Y, where Y is an LBA in LUN B's logical address space. Deduplication processing may determine that the first data written by the second write I/O operation to the logical address A2 804b is a duplicate of the first data written by the first I/O operation to the logical address A1 804a. In this case, the logical address A2 804b may simply reference or point to the single physical copy of the first data stored in the storage location 802.

At a subsequent point in time T3, a third write I/O operation may write yet another instance of the first data to the third logical address A3 804c. The logical addresses A1 804a, A2 804b, and A3 804c are different logical addresses. The logical address A3 804c may be, for example, LUN C, LBA Z, where Z is an LBA in LUN C's logical address space. Deduplication processing may determine that the first data written by the third write I/O operation to the logical address A3 804c is a duplicate of the first data currently stored in the storage location 802. In this case, the logical address A3 804c may simply reference or point to the single physical copy of the first data stored in the storage location 802.

In connection with the foregoing, an embodiment may maintain a deduplication reference count 810 denoting the number of times that a single instance of a page of data, such as stored in the cache location 802, is referenced in connection with deduplication. A deduplication reference count of 1 indicates that the associated page of data is only associated with a single logical address and has not been used to deduplicate any data. A deduplication reference count greater than 1 indicates that the associated page of data is associated with or referenced by multiple logical addresses and has been used to deduplicate data. The deduplication reference count associated with a page of data indicates the number of logical addresses that refer to the single instance of the data.

In the example 800, the deduplication reference count 810 that is associated with the first data referenced by the three logical addresses 804a-c may be 3.

The deduplication reference count and more generally the D score may also take into account other references to a single stored instance of a cached page of data. Such other references may be made more generally by any suitable storage entity in the system. For example, a snapshot is another storage entity that may reference a cached page of data. To further illustrate, consider a cached page of data P that appears in logical address A1 of a logical device or volume V, where there are three snapshots taken off V, called S1, S2 and S3 at times T21, T22 and T23, respectively. If the address A1 is overwritten between T22 and T23, then the original page P is referenced by S1 and S2. In this case, the cached page of data P may be referenced by the two different snapshot S1 and S2 at the same address A, and the deduplication reference count may be increased by 2. In such an embodiment, the deduplication reference count, or more generally, the D score may be increased due to snapshots that reference the same page. For example, consistent with the example above, assume there are 2 snapshots S1 and S2 referencing the page P in addition to the source logical device L that is the basis or source of the snapshots. Assume further that the same page P is referenced at the same logical address by the source logical device L and the 2 snapshots S1 and S2, then the deduplication reference count may be increased by each snapshot's reference to P, where the deduplication reference count may be 3 (e.g., due to the 3 references by L, S1 and S2).

Generally, the deduplication reference count may be characterized as metadata included in statistics associated with the stored single instance of the cached data page. The data page may be stored in the cache location in an embodiment in accordance with the techniques herein. In at least one embodiment, the metadata structures including virtualization layer blocks (VLBs) and additional details regarding the cache, such as described in U.S. patent application Ser. No. 16/665,328 filed on Oct. 28, 2019, entitled Caching Techniques, Kucherov, et al., which is incorporated by reference herein, may also be used.

Figure 9:
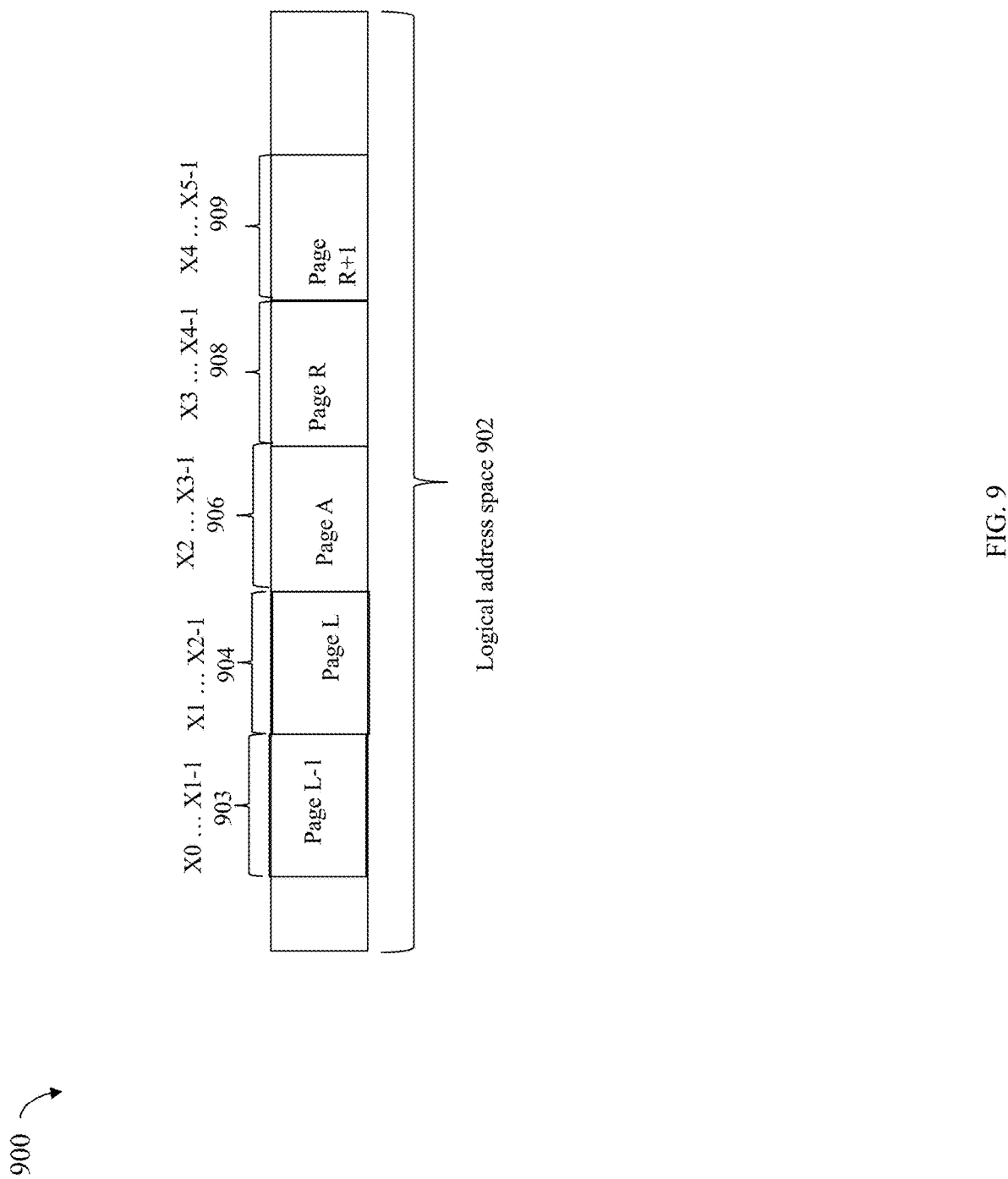
FIG. 9 is an example illustrating neighboring pages in a logical address space in an embodiment in accordance with the techniques herein.

The N score or neighbor score of a cached page of data may be used to generally provide for increased weight or preference in retaining pages of data in cache which may be characterized as having popular neighbors, where a neighbor is another neighboring page of data. The neighbors with respect to a cached page of data may be determined based on the logical address space including the data. For example, with reference to FIG. 9, a page A may refer to a page of data that is stored in the cache and also mapped to the logical addresses X2 through X3-1 in the logical address space 902. The page L and the page R are neighboring pages of data with respect to the page A. The pages L and R are located at logical addresses that are immediately adjacent to and consecutive with respect to the logical addresses (e.g., X2 through X3-1) associated with the page A in the logical address space 902. In this example, the page L is located at the logical addresses X1 through X2-1 904; the page A is located at the logical addresses X2 through X3-1; and the page R is located at the logical addresses X3 through X4-1.

The popularity of each neighboring page that is in the cache may be determined with respect to one or more defined popularity metrics. In at least one embodiment, the popularity of a neighboring page may be determined using a popularity metric based on the time of the most recent access of the neighboring cached page. In at least one embodiment, the popularity of a neighboring page may be determined using a popularity metric based on deduplication related criteria, such as the deduplication reference count of the neighboring page. The deduplication reference count is described elsewhere herein, for example, such as in connection with the D count and FIG. 8. In some embodiments, the deduplication reference count for a page may be inaccurate, for example, due to buffering of updates to the deduplication reference count. For example, a system may buffer multiple increment and/or decrement operations to a page's deduplication reference count, and execute them in bulk after a delay. This means that any specific page's deduplication reference count may not be up to date. Therefore, when computing the score of a page, it's important not to look only at its deduplication reference count but also at the deduplication reference count of its neighbors. A high deduplication reference count of neighbors of a particular page may indicate that the page being examined should have a high deduplication reference count as well, and therefore be kept in cache. Thus, it is beneficial to consider the deduplication reference count of neighboring pages in the score of the page.

In at least one embodiment, for a cached page of data, such as page A, processing may determine whether any of its neighboring pages of data, such as page L and page R, are also in the cache. For each neighboring page of data also in the cache, processing may be performed to determine whether the neighboring page of cache data is popular or not. In order to determine whether a neighboring page in cache is popular, one or more popularity metrics may be used. For example, in at least one embodiment, a neighboring page in the cache is considered popular if its deduplication reference count is greater than 1 and it has been accessed while in the cache within the last minute, or some other specified time period. In this example, the page A may have 0 popular neighboring pages in the cache, 1 popular neighboring page in the cache (e.g., only one of pages L or R), or 2 popular neighboring pages in the cache (e.g., both the pages L and R). Based on the number of neighboring pages that are popular, the cached page A may be assigned its N score. For example, if the page A has no popular neighboring pages that are in the cache, page A may have an N score=1; if the page A has 1 popular neighboring page in the cache, page A may have an N score=2; and if the page A has 2 popular neighboring pages in the cache, page A may have an N score=3.

It should be noted that the N score described above in connection with FIG. 9 examined neighboring pages with a relative page distance of "+1 page" (e.g., R page) and "−1 page" (e.g., L page) in the logical address space 902. More generally, an embodiment may select a different suitable relative page distance defining a contiguous interval in the logical address space 902 relative to the logical address of page A. For example, an embodiment may consider neighboring pages with a relative page distance of "+2 pages" and "−2 pages" in the logical address space 902 with respect to the logical address of the cached page A. In this case, for example, the neighboring pages considered for evaluation in determining the N score for page A may include the page L−1 having the logical addresses X0 through X1-1 903; the page L having the logical address X+1 through X2-1 904; the page R having logical addresses X3 through X4-1 908; and the page R+1 having logical addresses X4 through X5-1 909.

The A score or access time score of a cached page of data may be used to generally provide for increased weight or preference in retaining pages of data in cache which may be characterized as having been recently accessed. In at least one embodiment, the more recently accessed a cache page, the higher it's A score.

In at least one embodiment, the A score of a cached page of data may be based on the last or most recent time that the page has been accessed. In at least one embodiment and consistent with other discussion herein, the last or most recent time of access with respect to a page of cached data may be indicated by a time stamp associated with the cached page of data, where the time stamp is updated each time data of the cached page is accessed such as in connection with performing an I/O operation. In at least one embodiment, a cached page may be assigned an A score based on the window of time of the most recent access of the cache page. For example, the cached page may be assigned an A score=1 if the page has not been accessed in the last 5 minutes; assigned an A score=2 if the page has been accessed more than 1 minute ago but less than 5 minutes ago; and assigned an A score=4 if the page has been accessed within the last 1 minute. More generally, an embodiment may define any suitable time windows and associated A scores.

As a further variation in connection with the A score, an embodiment may also consider the number or frequency of accesses within a specified time period. For example, an embodiment may count the number of times a cached page has been accessed within the last 5 minutes and determine an A score for the cached paged based on the count. The higher the count, the higher the A score.

As yet a further variation in connection with the A score, an embodiment may consider both the frequency of access as well as the time of each such access. For example, an embodiment may define 2 windows of time as follows— window 1: access times within the last 1 minute; and window 2: access times greater than 1 minute and less than 5 minutes.

For a cache page of data, the number of access times falling into each of the 2 windows of time may be determined and then weighted where a lower weight is given to the older access times falling in the widow 2. For example, the A score may be calculated as a weighted value as in EQUATION 1:

$$A\ score=(W1*Q1)+(W2*Q2) \quad \text{EQUATION 1}$$

Where

W1 denotes a first weighting factor or coefficient for Q1;

Q1 denotes the number, frequency or count of the access times falling into window 1;

W2 denotes a first weighting factor or coefficient for Q2, where W1>W2; and

Q2 denotes the number, frequency or count of the access times falling into window 2.

In at least one embodiment, the overall or page score for a cached page may be determined in accordance with its C score, D score, N score and A score. For example, the overall or page score S for the cached page P may be based on any suitable specified function F as in EQUATION 2:

$$S(P)=F(Cscore(P),Dscore(P),Nscore(P),Ascore(P)) \quad \text{EQUATION 2}$$

where

P denotes the cached page for which the score S is determined;

C score (P) denotes the C score for the cached page P;

D score (P) denotes the D score for the cached page P;

N score (P) denotes the N score for the cached page P;

A score (P) denotes the A score for the cached page P; and

F is the function taking as inputs C score (P), D score (P), N score (P), A score (P), where the output of the function F is the overall or page score S for the page P.

For example, in at least one embodiment, the function F used to compute an overall weighted score S(P) may be as expressed in EQUATION 3:

$$S(P)=(W_r*R\ score(P))+(W_c*C\ score(P))+(W_n*N\ score(P))+(W_a*A\ score(P)) \quad \text{EQUATION 3}$$

where $W_r$ is the weight or coefficient of R score (P);

$W_c$ is the weight or coefficient of C score (P);

$W_n$ is the weight or coefficient of N score (P) and $W_a$ is the weight or coefficient of A score (P).

In connection with EQUATION 3, in at least one embodiment, the weights may be set to 1. In at least one embodiment, one or more of the weights in EQUATION 3 may be set to 0 in order to exclude consideration of a particular score in a term including the weight. For example, in an embodiment that excludes and does not consider the A score, its associated weight $W_a$ may be set to 0.

In at least one embodiment, the weights used in EQUATION 3 may be set to initial values and then adjusted iteratively over time based on measured increases in cache hit improvements obtained. For example, an embodiment in accordance with the techniques herein may use a machine learning algorithm or technique known in the art, such as multiple regression, to infer or predict values for the four weights $W_r$, $W_c$, $W_n$, and $W_a$ of EQUATION 3 that in result in the best cache hit ratio for a given I/O workload.

The cache hit ratio may be expressed as a ratio of the number of cache hits with respect to the sum of the number of cache hits and the number of cache misses. For example, for 200 cache hits and 50 cache misses over a period of time, the cache hit ratio is 200/(200+50)=200/250=0.80 or 80%. In at least one embodiment in which the cache includes only read data, the cache hit ratio may be determined with respect to read I/O operations, read cache hits and read cache misses. In such an embodiment, the cache hit ratio may be the number of read hits with respect to the total number of reads.

Figure 10:
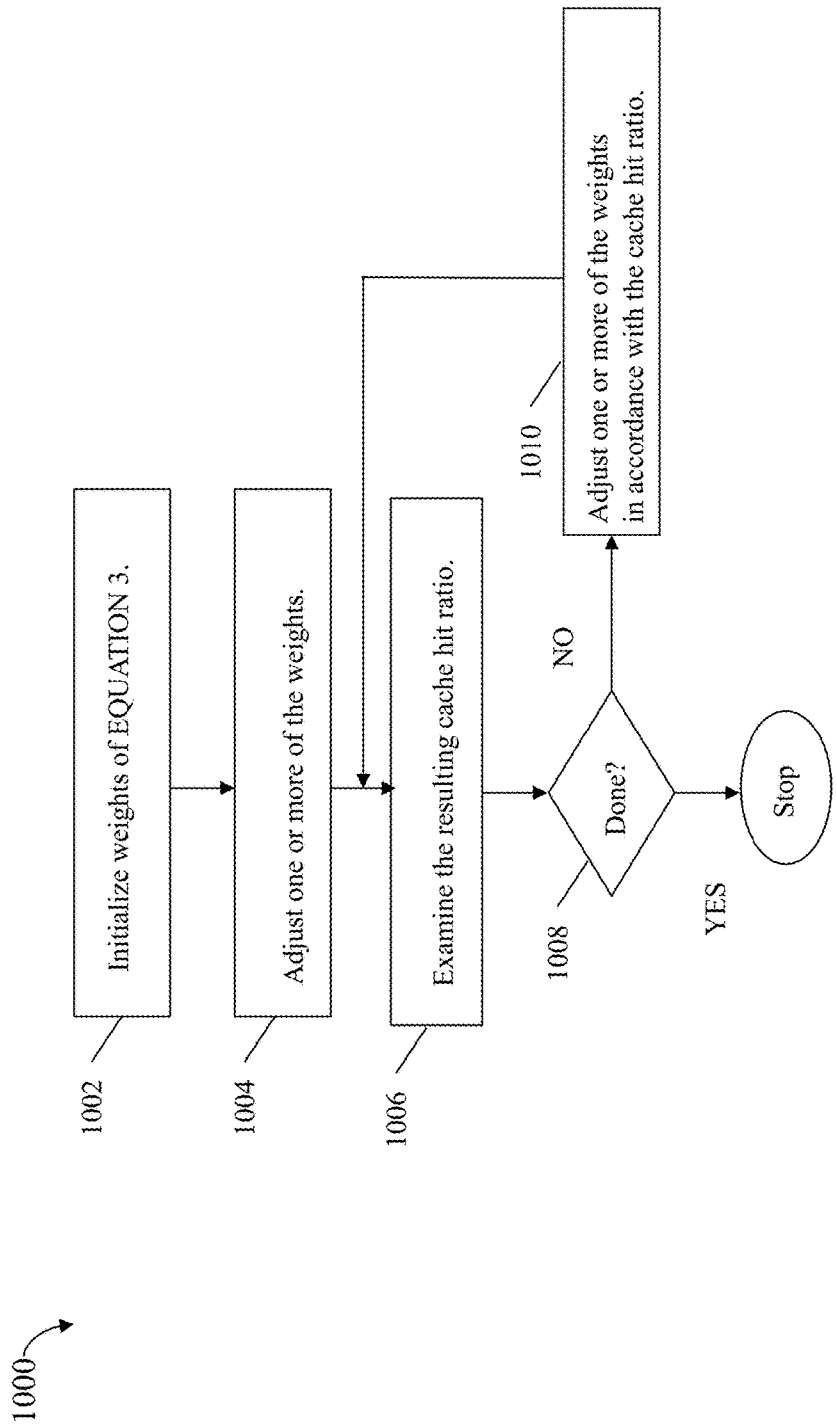
FIGS. 10, 11 and 12 are flowcharts of processing steps that may be performed in an embodiment in accordance with the techniques herein.

In at least one embodiment, processing may be performed as illustrated in the flowchart 1000 of FIG. 10 to dynamically adjust the 4 weights of EQUATION 3 over time as follows. In the step 1002, the four weights $W_r$, $W_c$, $W_n$, and $W_a$ of EQUATION 3 may be initialized to some initial values. For example, all the weights may be set to 1. As a variation, $W_a$ may be initially set to 1 with all other weights $W_r$, $W_c$, and $W_n$, set to 0. In this latter case, the initial or starting state may be analogous to a starting state of an LRU type of score.

From the step 1002, processing proceeds to the step 1004 where one or more of the 4 weights of EQUATION 3 may be adjusted, such as by increasing or decreasing one or more of the weights. While the weights have their adjusted values, processing proceeds to the step 1006 where cache hit performance may be observed for a time period while I/O operations are serviced. In the step 1006, the cache hit ratio may be determined for the time period during which the adjusted weight values have been in effect.

From the step 1006, processing proceeds to the step 1008 to determine whether processing performed to adjust the weights of EQUATION 3 has completed. If the step 1008 evaluates to yes, processing stop. Other, processing proceeds to the step 1010 where one or more of the weights may be further adjusted in accordance with the cache hit ratio obtained in connection with the step 1006. In particular, the step 1010 may include determining whether the cache hit ratio increased or decreased using the adjusted weight values. Based on whether the adjusted weight values increased (e.g., improved) or decreased (e.g., worsened) the cache hit ratio, the weights may be further adjusted. For example, if decreasing $W_a$ and increasing each of the weights $W_r$, $W_c$, and $W_n$, increased the cache hit ratio, another iteration of weight adjustment may be performed where, for example, $W_a$ may be further decreased and each of the weights $W_r$, $W_c$, and $W_n$, may be further increased. As another example, if decreasing $W_a$ and increasing each of the weights $W_r$, $W_c$, and $W_n$, decreased the cache hit ratio, another iteration of weight adjustment may be performed where, for example, $W_a$ may be increased and one or more of the weights $W_r$, $W_c$, and $W_n$, may be decreased. In this manner, if the cache hit ratio improved or increased, a weight may be further adjusted in the same direction. If the cache hit ratio got worse or decreased, a weight may be adjusted in the opposite direction. From the step 1010, processing may again proceed to the step 1006 for further evaluation of the latest set of adjustments and the effect of such adjustments on the observed cache hit ratio. In this manner, the foregoing steps 1006, 1008 and 1010 may be repeatedly performed to determine values for the weights of EQUATION 3.

In at least one embodiment, the foregoing processing to select values for the 4 weights of EQUATION 3 may be repeated periodically in order to adapt the 4 weights for any changes in the cached data.

In connection with the step 1008, an embodiment may use any suitable stopping criteria to determine when to stop adjusting the weights and thereby result in the step 1008 evaluating to yes. For example, an embodiment may stop adjusting the weights if a maximum number of adjustment iterations of the step 1010 have been performed, if the last specified number of iterations have not resulted in improving the cache hit ratio by at least a threshold amount, if prior recent iterations indicate a convergence of the weights to particular values (e.g., where the amount of variation in the weight values used in the recent iterations does not exceed a specified amount of variation), and the like.

Figure 11:
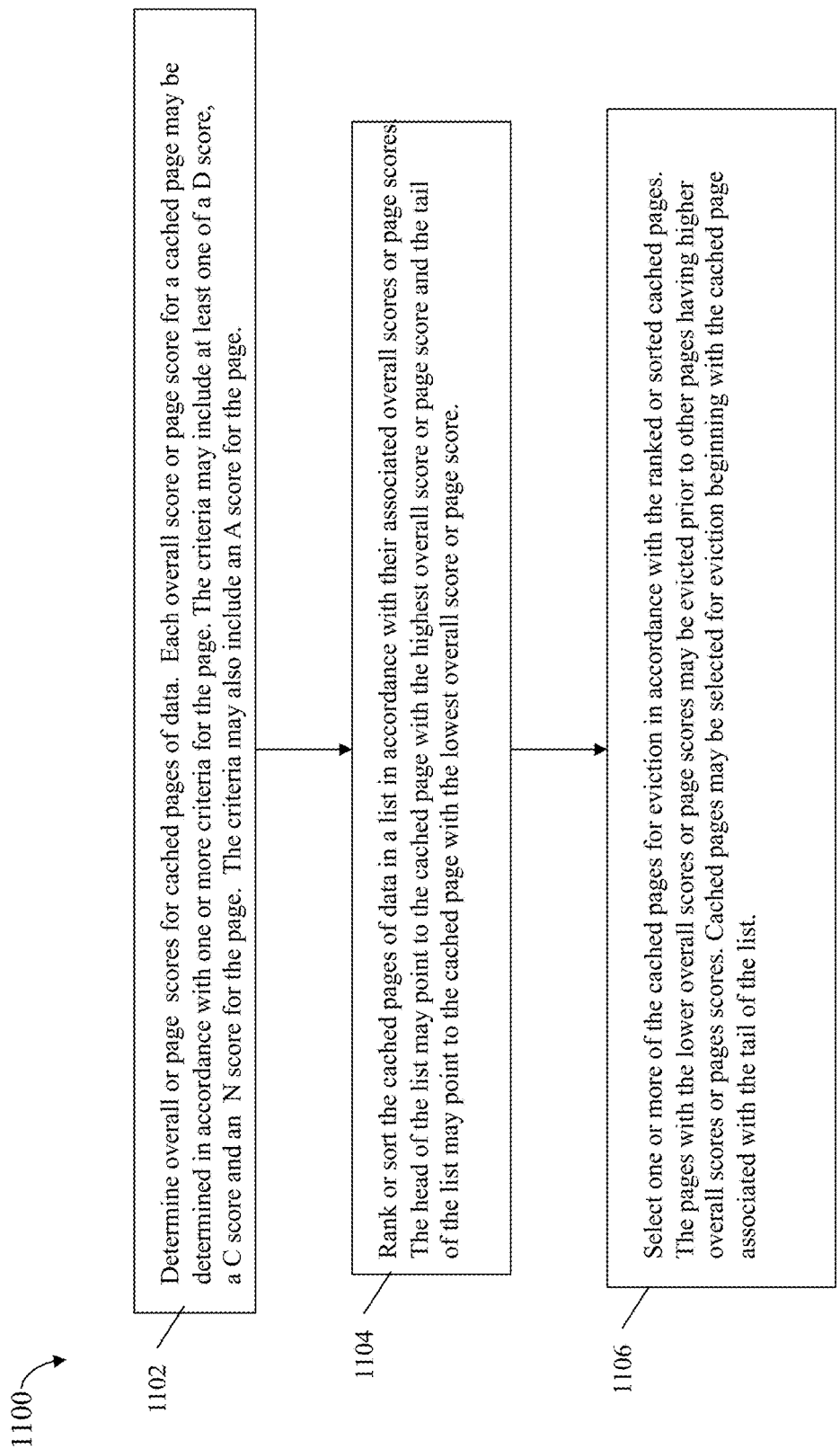

Referring to FIG. 11, shown is another flowchart of processing steps that may be performed in an embodiment in accordance with the techniques herein. The flowchart 1100 summarizes processing as described above. The processing of the flowchart 1100 may be performed, for example, periodically in order to reevaluate, reorder and sort the cached pages based on their associated overall or page scores and evict one or more cached pages.

At the step 1102, processing is performed to determine the overall or page scores for the cached pages of data. In at least one embodiment, the cached pages may be stored in a linked list structure such as described elsewhere herein. Each overall or page score for a cached page may be determined in accordance with one or more criteria for the page. The criteria may include one or more of a D score, a C score and an N score for the page. The criteria may also include an A score for the page. From the step 1102, control proceeds to the step 1104.

At the step 1104, processing may be performed to rank or sort the cached pages of data in the list in accordance with the associated overall scores for page scores or the cached pages. The head of the list may point to the cached page with the highest page score or overall score and the tail of the list may point to the cached page with the lowest page score or overall score. From the step 1104, control proceeds to the step 1106.

At the step 1106, processing may be performed to select one or more of the cached pages for eviction from the list in accordance with the ranked or sorted cached pages. The pages with the lower page scores or overall scores may be evicted from the cache prior to other pages having higher page scores or overall scores. In at least one embodiment using the list as described elsewhere herein, the pages are sequentially ordered in the list, from head to tail, based on the page scores or overall scores of the pages. In such an embodiment, the head points to the cached page with the highest page score or overall score and the tail points to the cached page with the lowest page score or overall score. In such an embodiment, cached pages may be selected for eviction beginning with the cached page associated with the tail of the list.

Figure 12:
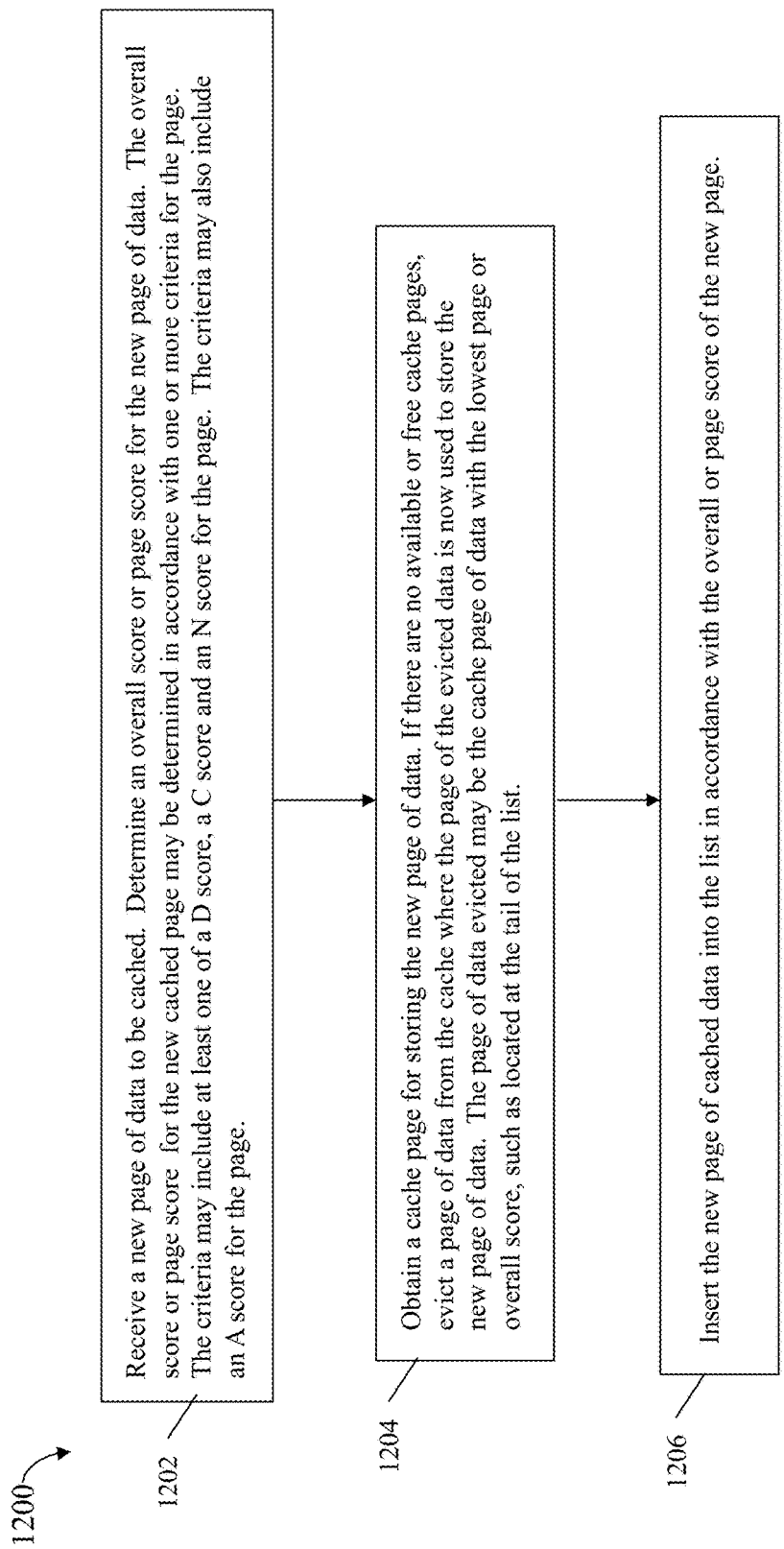

Referring to FIG. 12, shown is yet another flowchart of processing steps that may be performed in an embodiment in accordance with the techniques herein. The processing of the flowchart 1200 may be performed in response to receiving a new page of data that needs to be stored in the cache.

At the step 1202, a new page of data to be cached may be received. Processing may be performed to determine an overall score or page for the new page of data. The overall score or page for the new cached page may be determined in accordance with one or more criteria for the page. Generally, the criteria used to determine the page or overall score for the new page of data is the same criteria used to determine the page or overall scores of the other cached pages of data. The criteria may include at least one of a D score, a C score and an N score for the page. The criteria may also include an A score for the page. From the step 1202, control proceeds to the step 1204.

At the step 1204, processing may be performed to obtain a cache page for storing the new page of data. If there are no available or free cache pages, processing may be performed to evict a page of data from the cache where the page of the evicted data is now used to store the new page of data. The page of data evicted may be the cache page of data with the lowest page score or overall score, such as located at the tail of the list. From the step 1204, control proceeds to the step 1206.

At the step 1206, processing may be performed to insert the new page of cached data into the list in accordance with the overall or page score of the new page. In at least one embodiment where the list is maintained in sorted order based on the overall or page scores of the pages of cached data, the new page of cached data may be inserted into the list based on the overall score or page score of the new page. For example, if the overall score or page score of the new page of cached data is greater than the overall score or page score of any other page currently stored in the cache, the new page of cached data may be inserted at the head of the list.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing cache management comprising:
   receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and
   storing the plurality of pages of data in a cache in accordance with the plurality of page scores, wherein each of the plurality of page scores associated with one of the plurality of pages of data is determined in accordance with the one or more criteria including the deduplication score for said one page of data stored in the cache, and wherein the deduplication score for said one page of data stored in the cache is determined in accordance with a deduplication reference count indicating a number of times said one page of data is referenced by a logical address.

2. The method of claim 1, wherein each of the plurality of page scores associated with one of the plurality of pages of data is determined in accordance with the one or more criteria including the compression score for said one page of data stored in the cache.

3. The method of claim 1, wherein the each of the plurality of page scores associated with one of the plurality of pages of data is determined in accordance with the one or more criteria, and wherein the one or more criteria further includes an access score determined in accordance with when the one page of data was last accessed.

4. The method of claim 1, wherein each of the plurality of page scores associated with one of the plurality of pages of data is determined in accordance with the one or more criteria, and wherein the one or more criteria further includes an access score determined in accordance with a frequency of accesses of the one page of data that occurred within a specified window of time.

5. The method of claim 1, wherein the one or more criteria include the neighbor score, the deduplication score, the compression score, and an access score.

6. The method of claim 1, wherein the cache is a read cache that includes only read data for read I/O operations.

7. The method of claim 1, further comprising:
   sorting the plurality of pages stored in the cache in accordance with the plurality of page scores; and
   selecting a first page of the plurality of pages stored in the cache for eviction, wherein the first page is determined by said sorting as having a lowest page score of the plurality of pages scores.

8. A method of performing cache management comprising:
   receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and
   storing the plurality of pages of data in a cache in accordance with the plurality of page scores, wherein each of the plurality of page scores associated with one of the plurality of pages of data is determined in accordance with the one or more criteria including the compression score for said one page of data stored in the cache, wherein said one page of data is stored in the cache in a compressed form, and wherein the compression score for said one page of data stored in the cache is determined in accordance with an amount of cache consumed to store the compressed form of said one page of data.

9. The method of claim 8, wherein the cache includes a plurality of buckets of cache pages, wherein each of the plurality of buckets is associated with a different one of a plurality of cache page sizes, and wherein cache pages included in a same one of the plurality of buckets are a same size that is equal to the different one of a plurality of cache page sizes associated with the same one of the plurality of buckets.

10. The method of claim 9, wherein each of the plurality of pages of data is stored in the cache in a compressed form and wherein the compressed form of said each page of data has an associated compressed size, and wherein the compressed form is stored in a cache page selected from one of the plurality of buckets having an associated cache size that is a smallest of the plurality of cache page sizes capable of storing the compressed form.

11. A method of performing cache management comprising:
   receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and storing the plurality of pages of data in a cache in accordance with the plurality of page scores, wherein each of the plurality of page scores associated with one of the plurality of pages of data is determined in accordance with the one or more criteria including the neighbor score for said one page of data stored in the cache, wherein the neighbor score uses a popularity metric based on deduplication related criteria of neighboring pages of data.

12. The method of claim 11, wherein the neighbor score for said one page of data stored in the cache is determined based on one or more neighboring pages of data with respect to said one page of data, and wherein each of the one or more neighboring pages of data and said one page of data are located in a logical address space, and wherein each of the one or more neighboring pages are located in logical addresses adjacent to other logical addresses mapped to said one page of data.

13. The method of claim 12, further comprising:
determining that a first of the one or more neighboring pages of said one page of data is stored in the cache; and
determining whether the first neighboring page is popular in accordance with the popularity metric, wherein the popularity metric determines that the first neighboring page is popular in accordance the deduplication related criteria of the first neighboring page.

14. The method of claim 13, wherein the deduplication related criteria of the first neighboring page indicates that the first neighboring page is popular if it has an associated deduplication reference count above a specified threshold.

15. The method of claim 13, wherein the popularity metric determines that the first neighboring page is popular of the first neighboring page stored in the cache has a last access time that is within a specified window of time.

16. A method of performing cache management comprising:
receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with criteria including a deduplication score, a compression score, and a neighbor score that uses a popularity metric based on deduplication related criteria of neighboring pages of data, and an access score; and
storing the plurality of pages of data in a cache in accordance with the plurality of page scores, wherein each of the plurality of page scores associated with one of the plurality of pages of data stored in the cache is determined using a function that takes a plurality of inputs for the one page of data, wherein the plurality of inputs includes the neighbor score, the deduplication score, the compression score, and the access score.

17. The method of claim 16, wherein the function computes said each page score for the one page of data stored in the cache as a weighted sum of a plurality of terms in which each of the plurality of terms includes one of the plurality of inputs and a weight corresponding to said one input.

18. A system comprising:
one or more processors; and
a memory comprising code stored therein that, when executed, performs a method of cache management comprising:
receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and
storing the plurality of pages of data in a cache in accordance with the plurality of page scores, wherein each of the plurality of page scores associated with one of the plurality of pages of data is determined in accordance with the one or more criteria including the deduplication score for said one page of data stored in the cache, and wherein the deduplication score for said one page of data stored in the cache is determined in accordance with a deduplication reference count indicating a number of times said one page of data is referenced by a logical address.

19. A non-transitory computer readable medium comprising code stored thereon that, when executed, performs a method of cache management comprising:
receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and
storing the plurality of pages of data in a cache in accordance with the plurality of page scores, wherein each of the plurality of page scores associated with one of the plurality of pages of data is determined in accordance with the one or more criteria including the deduplication score for said one page of data stored in the cache, and wherein the deduplication score for said one page of data stored in the cache is determined in accordance with a deduplication reference count indicating a number of times said one page of data is referenced by a logical address.

20. A system comprising:
one or more processors; and
a memory comprising code stored therein that, when executed, performs a method of cache management comprising:
receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and storing the plurality of pages of data in a cache in accordance with the plurality of page scores, wherein each of the plurality of page scores associated with one of the plurality of pages of data is determined in accordance with the one or more criteria including the compression score for said one page of data stored in the cache, wherein said one page of data is stored in the cache in a compressed form, and wherein the compression score for said one page of data stored in the cache is determined in accordance with an amount of cache consumed to store the compressed form of said one page of data.

21. A system comprising:

one or more processors; and a memory comprising code stored therein that, when executed, performs a method of cache management comprising:

receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with one or more criteria including one or more of a deduplication score, a compression score, and a neighbor score that uses a popularity metric based on deduplication related criteria of neighboring pages of data; and storing the plurality of pages of data in a cache in accordance with the plurality of page scores, wherein each of the plurality of page scores associated with one of the plurality of pages of data is determined in accordance with the one or more criteria including the neighbor score for said one page of data stored in the cache, wherein the neighbor score uses a popularity metric based on deduplication related criteria of neighboring pages of data.

22. A system comprising:

one or more processors; and a memory comprising code stored therein that, when executed, performs a method of cache management comprising:

receiving a plurality of pages of data having a plurality of page scores, wherein each of the plurality of pages of data is associated with a corresponding one of the plurality of page scores, wherein the corresponding one of the plurality of page scores associated with said each page of data is determined in accordance with criteria including a deduplication score, a compression score, and a neighbor score that uses a popularity metric based on deduplication related criteria of neighboring pages of data, and an access score; and storing the plurality of pages of data in a cache in accordance with the plurality of page scores, wherein each of the plurality of page scores associated with one of the plurality of pages of data stored in the cache is determined using a function that takes a plurality of inputs for the one page of data, wherein the plurality of inputs includes the neighbor score, the deduplication score, the compression score, and the access score.

* * * * *